Figure 1:
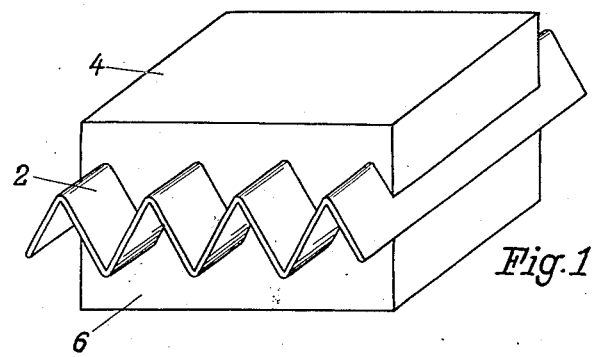

Feb. 25, 1936. B. CORI 2,032,262

GAS FILTER

Filed Feb. 18, 1935

Inventor:
Blanche Cori

By A. D. Adams
atty.

Patented Feb. 25, 1936

2,032,262

UNITED STATES PATENT OFFICE 2,032,262

GAS FILTER

Blanche Cori, Berlin, Germany

Application February 18, 1935, Serial No. 7,139
In Germany February 13, 1934

4 Claims. (Cl. 183—71)

The present invention relates to novel filters for filtering air or gases to free them from any particles of matter, however minute, which may be held in suspension therein.

The invention is useful in gas masks, for example, to arrest the extremely minute or ultra microscopical poisonous particles of matter which are present in suspension in the poisonous gas itself. The invention, however, is not to be considered as limited in its use to gas masks as it is equally useful in any other apparatus or situation in which it is desired to free air or gases from particles of matter held in suspension therein.

The invention and its aims and objects will be readily understood from the following description of a preferred mode or manner of carrying out my novel method and of one illustrative form of novel product of said method which is shown in the accompanying drawing.

Figure 2:
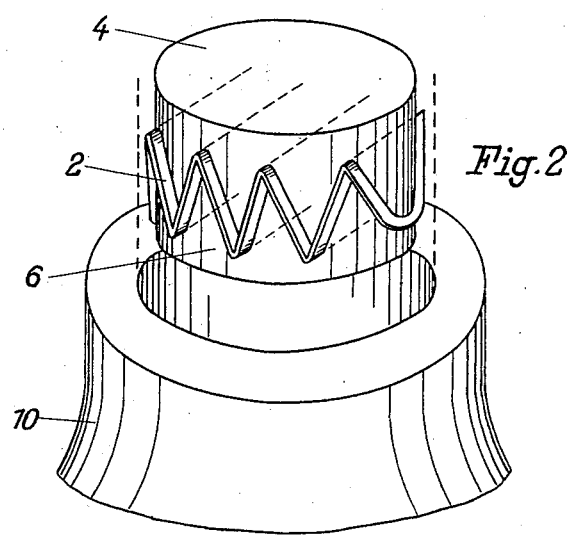
Figure 3:
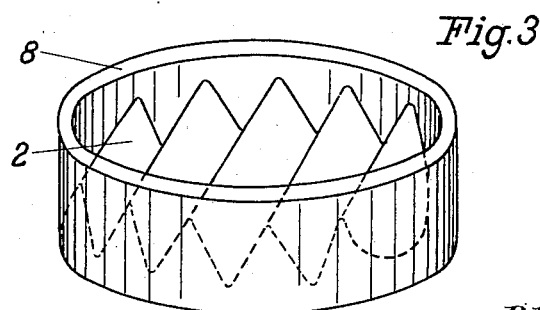

In the drawing:

Fig. 1 is a diagrammatic perspective view showing how a filtering layer folded or corrugated in the desired shape, by pleating for example, is caused to keep said shape during the carrying out of my method, by being held for example between two suitably shaped blocks, one edge of said filtering layer projecting on all sides beyond the adjacent edges of said blocks so as to be embedded in the surrounding wall of the filter and thus insure an airtight closure;

Fig. 2 is also a diagrammatic perspective view showing the folded or pleated filtering layer held between two blocks suitably shaped for this purpose and an exterior mold to surround said blocks for forming the cylindrical casing about said blocks, so that the projecting edge of said filtering layer shall become embedded in the lateral wall of said casing; and Fig. 3 is a diagrammatic perspective view of the finished filter ready for insertion in the apparatus, the respiration box of a gas mask for example, in which it is to be used.

In carrying out my invention the filtering layer 2, preferably cut from a continuous strip of fabric, is first pleated. It is then placed between the opposed surfaces of two blocks 4 and 6 having their surfaces between which the pleated strip is placed corrugated to correspond to the pleating of said strip, the corrugations of one block being staggered relatively to those of the other so that the angular ribs on one block will fit within the angular depressions on the other block.

While the blocks 4 and 6 may be of any desired shape, circular, polygonal, or otherwise, according to the apparatus in which the filter is to be used, it is preferable, if the filter is to be used in a gas mask, to make said blocks cylindrical, as shown in Fig. 2, rather than polygonal, as shown in Fig. 1, as the respiration boxes of gas masks are usually cylindrical.

While said blocks 4 and 6 are thus held clamped together with the pleated filtering layer therebetween, as shown in Fig. 2, and with the edge of said filtering layer projecting somewhat beyond the outer walls of said blocks, the surrounding casing or wall 8, herein cylindrical, for said filtering layer will be formed in any suitable manner and so that said projecting edge of said filtering layer will be embedded on all sides in the wall of said casing so as to be practically integral therewith.

Said casing may be formed or fashioned of plastic or other workable material or of materials of a consistency to be poured or sprayed. In every case, however, the material will be such as will solidify or become set on standing and will then be impervious to air or gases. It is to be understood that the casing may have any suitable means to secure it in a respirator. For example, it may be frictionally secured or may be provided with the usual screw threads or an annular flange on its exterior wall.

While in accordance with my invention said casing 8 may be fashioned or formed in any way best suited to the nature or the consistency of the material employed, a very convenient way is to surround said blocks 4 and 6, and the pleated filtering layer between them, as shown in Fig. 2 for example, with a mold, herein a cylindrical mold 10. The material of which said casing 8 is to be fashioned will then be introduced into the annular space between the peripheral surfaces of said blocks and the inner surface of said mold in any suitable way, dependent upon the consistency of the material used. A wide range of materials may be used to form said casing, for example substances or of a consistency to be poured or sprayed, such as artificial resin or bakelite, either in solution or of a workable consistency, with the aid of pressure and heat. Bakelite may be powdered. Artificial resin or similar materials are to be preferred to molten materials having higher melting points when the material of which the filtering layer is made is likely to be exposed to ignition.

When powdered artificial resin or bakelite is used it may be introduced into said annular space and the powder then worked or fashioned to form said casing 8 by heating and compressing it in said annular space. For such purpose a heated annular compression die may be used which fits said annular space and is pressed down therein. However, the resin or other substances may be melted and poured in the mold or may be dissolved and poured.

Whatever the material used to form said casing 8, the edge or marginal portion of said filtering layer will be embedded in the wall of said casing and will form an integral part thereof and become inseparable therefrom when the material of said casing solidifies or becomes set, thus insuring a gas and airtight seal between the entire edge of said filtering layer and the wall of said casing.

It will be noted that the heretofore experienced difficulty in securing an air and gastight seal between the relatively long edge of the filtering layer and the wall of the surrounding casing, where the folded, pleated filtering layer extends transversely to the direction of flow of the air to be breathed, is solved in a very simple manner by the present invention by embedding the edge of said filtering layer in the wall of a casing so as to form an airtight and gastight seal therewith, said casing consisting of material that is impervious to air or gas and may be inserted air and gastight into the respiration box of a gas mask. Applicant's novel method provides a simple, cheap method of making filters for material held in suspension in the gas or air to be filtered, particularly where the filtering layer is folded transversely to the direction of flow of the air or gas to be breathed, and in which an absolutely gas and airtight seal between the inner wall of the casing and the filtering layer is secured. Said filtering layer may be made in the most simple manner by pleating or corrugating a strip of fabric and is more efficient than a plain filter.

In accordance with the invention also a filter for air or gases having material in suspension therein is provided in which the manifoldly pleated or corrugated filtering layer is embedded in the lateral wall of the surrounding casing consisting of material impervious to air and gases, in such manner that said filtering layer divides the interior of said casing into two zones one of which is toward the breathing organs when said filter is in use while the other is toward the poisonous exterior air, said filtering layer forming with said casing an integral inseparable unit.

One particular advantage of the invention resides in the fact that the filtering layer itself may be formed from a finished strip of fabric by pleating, it being obviously more advantageous and preferable to make the filtering layer in continuous single breadths than to mold it from a watery paste in a mold of the desired shape.

I am aware that the invention may be embodied in other specific forms without departing from the spirit or essential attributes thereof, and I therefore desire the present embodiment to be considered in all respects as illustrative and not restrictive, reference being had to the appended claims rather than to the forgoing description to indicate the scope of the invention.

I claim:

1. A filter of the character described comprising, in combination, a unitary, hollow, elongated casing composed of hardened moldable material impervious to gas and air; and a filtering layer composed of a single piece of fabric having transverse pleats extending entirely across the layer and secured transversely of said casing intermediate its ends with the edges of the layer imbedded throughout in the wall of said casing to form a gas and air tight seal between said layer and said casing, the imbedded pleated edges maintaining said layer in its pleated form.

2. A filter of the character described comprising, in combination, an elongated, cylindrical casing open at both ends and composed of a unitary mass of hardened moldable material impervious to gas and air; a filtering layer of fabric having parallel pleats extending entirely across it mounted in said casing intermediate its ends and having its marginal edge imbedded throughout in the material of said casing to provide an air tight seal between the layer and said casing and to maintain said layer in its pleated form.

3. An air and gas filter of the character described comprising a cylindrical unitary casing composed of hardened resinous material; and a filtering layer composed of a single piece of fabric extending transversely of said casing and having parallel pleats across the entire layer with its edge imbedded in the wall of the casing to form a gas and air tight seal between the layer and said casing.

4. A filter of the character described comprising an elongated cylindrical casing composed of bakelite; and a filtering layer extending across said casing intermediate its ends having pleats extending transversely of the casing throughout the area of the layer, the edge of said layer being imbedded at all points around its periphery in the bakelite to provide a gas and air tight seal between said layer and said casing.

BLANCHE CORI.